United States Patent [19]

John

[11] 4,263,587
[45] Apr. 21, 1981

[54] LIQUID LEVEL CONTROL SYSTEM

[75] Inventor: Robert S. John, Deerfield, Ill.

[73] Assignee: International Telephone and Telegraph Corporation, New York, N.Y.

[21] Appl. No.: 28,388

[22] Filed: Apr. 9, 1979

[51] Int. Cl.$^3$ .................................................. G08B 21/00
[52] U.S. Cl. ........................... 340/620; 73/304 R; 340/527; 122/504; 122/504.2
[58] Field of Search ............... 340/620, 618, 619, 621, 340/622, 623, 624, 625, 59, 527, 528, 529, 530; 328/1; 73/304 R; 122/504, 504.2

[56] References Cited

U.S. PATENT DOCUMENTS

| | | | |
|---|---|---|---|
| 2,385,161 | 9/1945 | Pinkerton | 340/620 X |
| 3,588,892 | 6/1971 | Scheidweiler | 340/629 X |
| 3,978,464 | 8/1976 | Miesterfeld | 340/59 X |
| 4,087,706 | 5/1978 | Koester, Jr. | 328/1 X |
| 4,149,162 | 4/1979 | Enemark et al. | 340/630 X |

Primary Examiner—John W. Caldwell, Sr.
Assistant Examiner—Daniel Myer
Attorney, Agent, or Firm—James B. Raden; Marvin M. Chaban

[57] ABSTRACT

A system for monitoring the liquid level in containers such as boilers and tanks. An electrode inserted into the container completes a path through the liquid when the liquid is at or above a predetermined level. When the liquid falls below the level, the path is opened. If the open path persists uninterruptedly for a timed period, an output device such as a relay is energized (or deenergized, if desired) to signal the low fluid level. The circuit path is powered at a low AC level from an AC source which also powers the output device. The low level AC in the circuit path to the liquid minimizes electrolytic and other problems within the container. The low level AC periodically resets a timing device within a direct current monitoring circuit before the expiration of the timed period, as long as the circuit path through the liquid remains closed. The output device is an optical coupling device isolating the output device from the timing device and from the low level AC path.

9 Claims, 2 Drawing Figures

LIQUID LEVEL CONTROL SYSTEM

BACKGROUND OF THE INVENTION

Liquid level controls for containers such as boilers are known as shown by U.S. Pat. No. 3,834,357 issued Sept. 10, 1974 to L. Kaczmarek et al. Level control circuits in which the electrical path through an electrode or probe is at a low AC level such as 24 volts is shown by U.S. Pat. No. 4,019,067 issued Apr. 19, 1977 to R. Gladstone. Further, the use of a device delaying the time of operation of the output device low level control is known from U.S. Pat. No. 3,366,095 issued Jan. 30, 1968 to M. De Leonardis. In this patent, the time delay function is performed by a bimetallic strip switch element which operates an output device in the form of alarm or input shutoff of some kind.

It is further well-known in the electrical arts that time delay may be accomplished by the use of resistive-capacitive (R-C) networks. Such delays have been incorporated into systems such as air conditioning to prevent too rapid cycling of the system following thermostatically controlled shutoff.

SUMMARY OF THE INVENTION

The present invention has as its object to provide an improved control circuit for a probe type level control such as used in installations such as hot water boilers.

The invention is directed to an improved control arrangement for a low level liquid sensing circuit incorporating a time delay which is prevented from reaching its timed conclusion by the continuing pulsations of an alternating current source.

The invention has as its object to provide a liquid level control system for a liquid container in which the level probe is energized by low voltage alternating current and in which the time delay control circuitry is powered by the same low voltage AC in a direct current mode.

A further object of the invention is to provide a liquid level control system using low voltage AC monitoring circuit in which the monitoring circuit is electrically isolated from both the input AC source and from the AC output circuits.

In the present system, an electronic time delay has been added to the low water cutoff circuit of a probe type level control. By adding this function, the application of this type of controls has been expanded to include low pressure steam installations. In so doing, the control must be mounted close to the waterline in a steam boiler to protect the system in the event the boiler water is not replenished in a timely manner, or a failure occurs in the feed water system. During the firing period of the boiler, there is a great amount of tubulence of the water level causing bounce of the liquid level. Since the probe low water cutoff is installed close to the level, the control may be subjected to oscillating water contact between ground and the probe causing relay chatter and nuisance shutdowns. For this reason, a nominal 30 sec. retard system was developed to hold the operating relay in for this period, continuing to recheck the water level through the time cycle, and finally shutting the system down after the expiration of the period should the water level remain below the level of contact with the probe.

DETAILED DESCRIPTION OF THE DRAWINGS

Figure 1:
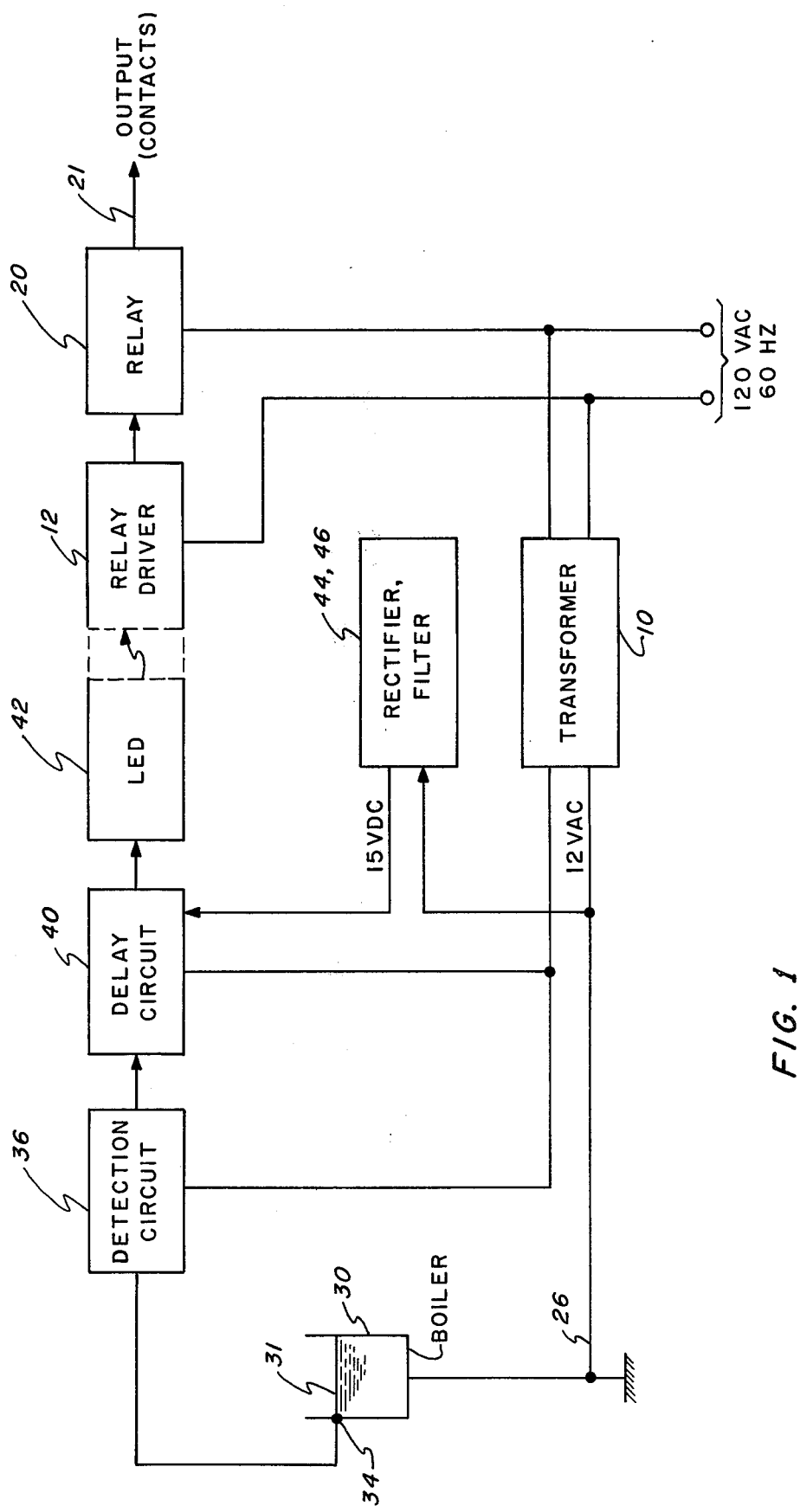
FIG. 1 is a block diagram of a circuit showing my invention.

In FIG. 1, I show a standard 120 Volt AC input with its leads directed both to transformer 10 and to a series path through the relay driver 12 and relay 20. The relay 20 has output contacts 21 (shown as lead and output arrow) which may operate any suitable control of liquid flow or of other controls for the boiler or liquid container 30.

The boiler 30 is shown having a liquid bearing container with its level 31 of liquid and an electrode or probe 34 mounted suitably in the container wall closely adjacent a low liquid level.

The electrode or probe is powered by an AC from the secondary of transformer 10. A convenient and adequate voltage is 12 volt AC output from the transformer. The probe energizing path may be traced from the transformer through the conductor 26 to the liquid in the container 30 and the probe 34 to the detection circuit 36 and back to the transformer. The low voltage AC line may be suitably grounded for safety purposes, as shown.

Figure 2:
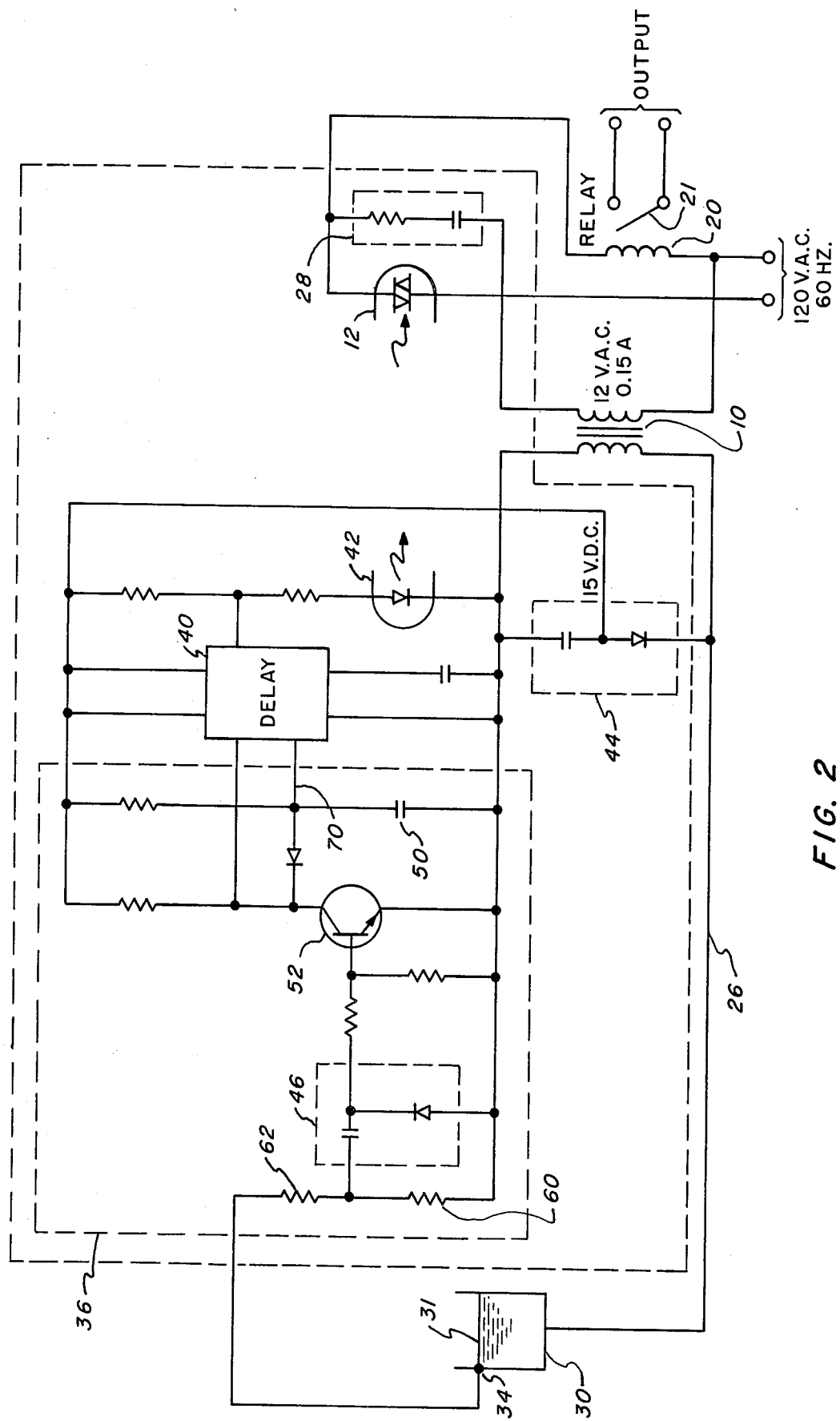
FIG. 2 is a schematic circuit drawing of the circuit shown in block form in FIG. 1.

A delay circuit 40 and LED 42 are both powered by a 15 volt direct current supply generated from the low voltage line through the use of a rectifier and filter arrangement 44-46 (FIG. 2).

The detection circuit 36 (FIG. 1) provides stepped down low voltage AC for the probe circuit. With liquid at or above the probe level, the detection circuit 36 periodically resets the input to delay circuit 40 to keep the delay circuit from reaching its timed-out condition.

When the liquid level drops below the probe level, the low level AC circuit is opened and the delay circuit 40 begins timing out. If the liquid circuit open condition persists for the entire timing period of the delay circuit, the delay times out and operates the LED 42. The relay driver 12 in the 120 volt line is optically coupled to the LED 42 and responds to operation of the LED to energize the relay 20. The relay operates to actuate its contacts and thereby indicate the low liquid level condition in a suitable fashion. The indication may be an alarm, latched shutoff of heating input, initiation of further liquid input or any suitable known response.

In FIG. 2, I show the circuit of FIG. 1 in greater detail. There I show the primary of transformer 10 connected to a 120 volt AC source. The 120 volt AC source also is connected to the series circuit comprised of relay driver 12 and relay 20. Positioned across the relay driver is a resistor capacitor circuit 28 for driver protection.

The detection circuit is both powered and line-isolated by the 12 VAC secondary of transformer 10, which also furnishes 15 VDC for the delay circuit. The probe itself is energized through the detection circuit input as shown. This input circuit limits the open probe voltage to a safe, low 12 VAC (no DC component), and the short circuit probe current to about 0.6 milliampere, as compared to about 120 VAC and 30 milliamperes in a representative presently available circuit. In the arrangement shown here, the entire delay circuit rides at 12 VAC with respect to the boiler and chassis case, and must be appropriately insulated.

The delay circuit contains a timer which may be an IC integrated circuit timer with the timing capacitor 50 shunted by a reset transistor 52. The input to transistor 52 is derived from the AC current flowing through the resistors 60 and 62 (both of which may be 10K resistors) in series with the conductance probe. When the probe current is sufficiently high to cause approximately a 1 volt AC drop across resistor 60, the transistor input will be periodically saturated at the peaks of the AC signal, and the transistor will be turned on and off at a 60 Hz rate. The 1 VAC drop corresponds to 0.1 milliampere AC current, or a liquid resistance of about 100K ohm for the circuit shown, with 12 VAC supplied. If the resistance of resistor 62 were reduced to zero, the probe voltage supply could be reduced from the 12 volts shown, to approximately 1 volt AC. The maximum probe current and liquid resistance would then be controlled by the value of resistor 60. With such low voltage and current requirements, the entire system could be considered to be inherently safe for use in most hazardous environments. Higher liquid resistance of up to 1 megohm could be accomodated by choice of the input resistance values and transformer voltage although fouling of the probe would likely make this value too high in practice. Lower liquid resistances simply provide higher AC to the input of the transistor.

When the input transistor turns "on", the timing capacitor 50 is discharged to about 0.3 volts. Simultaneously, the timer input circuit is triggered by the negative-going transistor output voltage on lead 70. The result is that the timer IC is continually retriggered (at 60 Hz) to start a new 30 second timing cycle. However, the timing capacitor voltage is continually being reset to about zero volts (at the 60 Hz rate), preventing completion of the timing cycle. When the liquid conductance current goes to zero (low water condition), then the transistor no longer turns on and off, and the timer circuit is free to continue the 30 second timing cycle to completion. If the water level is restored, or the probe is wetted, at any time during this cycle, the transistor will again receive an input signal, will turn on to short out the timing capacitor, and reset the timer to restart the timing period. If the liquid surges or varies to wet the probe more rapidly than once during a 30 second timing period, the low level output will not be actuated.

The output of timer circuit 40 feeds an optocoupler IC relay driver which completely isolates the relay coil from the low voltage circuit. The optocoupler is an LED-phototriac device. The LED 42 of this device is driven to approximately 15 milliampere by the output from the timer IC at the conclusion of an uninterrupted timing period. Radiation from this LED is internally coupled to switch on the phototriac 12 which is electrically isolated from the LED. The phototriac is in series with the 120 VAC relay coil, and this circuit is connected directly across the AC supply line, rather than via a transformer as in generally known circuits. The total transformer power requirement is therefore only about 0.3 Watts total to supply the probe and time delay circuits. By minimizing the power in the transformer secondary, a low cost transformer may be used. A relay is shown as the output control device rather than a semiconductor due to the lower cost and greater tolerance for electrical abuse of the electromechanical relay for given current ratings. However, semiconductors could be used throughout.

In normal operation, the relay may remain operated whenever the sensed liquid covers the probe. When the liquid level falls below the probe level for a period of more than 30 seconds, the relay is turned off, and the normally-closed contacts are reclosed to actuate an alarm or other device. This action is fallsafe in that it also corresponds to the power-off or power-failure condition. A failure to send an alarm due to the system components themselves could only be caused if the phototriac failed in a short-circuit mode, or if the relay contacts welded together, remaining in the "relay coil actuated" condition. Alternatively, a normally off relay could be used, the relay being turned on by the relay driver circuit indicating the completion of a timing period of low liquid level.

I claim:

1. A system for controlling the level of liquid within a container having an electrode closely adjacent a predetermined level of liquid, said electrode adapted to maintain a closed electrical path through the liquid as long as liquid is at least at said level, a source of alternating current, a relay means and a switch means serially disposed across said alternating current source, means for coupling said closed electrical path to said source to power said path with continuous low voltage alternating current, means for operating said switch means in response to an open circuit condition in said path indicative of liquid level below said electrode, the condition continuing uninterruptedly for a predetermined time period, said operating means comprising a time delay circuit having a predetermined cycle duration, means for resetting said time delay means at intervals less than the duration of said time delay circuit in response to the continued flow of current in said electrical path, said time delay means responsive to an open circuit condition continuing in said path for more than said predetermined duration for causing the operation of said switch means to energize said relay.

2. A system as claimed in claim 1, in which said switch means and said switch operating means are electrically isolated from one another.

3. A system as claimed in claim 2, in which there is a direct current network comprising said switch operating means and said time delay means, and said network is powered by said low voltage alternating current from said path.

4. A system as claimed in claim 3, in which said switch means and said switch operating means comprise an optical coupling device.

5. A system for indicating a condition in which the level of liquid in a container drops below a predetermined level, said system including an AC source, an output device directly connected to said source whereby to provide AC at the source voltage to said output device, a circuit for sensing the level of liquid in said container, said sensing circuit being coupled to said source to provide lower voltage AC continuously to the sensing circuit, said sensing circuit including an electric probe positioned in said container to maintain a closed alternating current electrical path when the liquid is at least as high as said predetermined level and for opening said path with the liquid below the predetermined level, a timing circuit powered by said lower voltage AC to complete a timing cycle of predetermined duration on said sensing circuit being open uninterruptedly for said duration, reset means pulsed by said lower voltage AC at the standard AC cycling rate as long as said electrical path remains closed to reset the timing circuit to interrupt the timing circuit cycle before completion of its duration, said reset means pulsed by a maintained closed electrical path through the liquid at a continuous cycle rate, said output device coupled to said timing circuit to respond to expiration of an uninterrupted timing cycle and provide an output indication of liquid below said predetermined level.

6. A system as claimed in claim 5, in which the coupling of said output device to said timing circuit includes an optical coupling comprising a light emitting diode connected to the output of the timing circuit, and a phototriac connected to said output device.

7. A system as claimed in claim 5, in which said resetting means comprises a transistor rendered conductive on each cycle of the AC voltage source to reset the timing circuit to the start of its timing cycle on each such pulse.

8. A system as claimed in claim 7, in which said timing circuit and said resetting means comprise a direct current circuit powered by said lower voltage AC circuit.

9. A system as claimed in claim 8, in which said output device comprises an electromechanical relay.

* * * * *